Sept. 28, 1943.  O. J. POUPITCH  2,330,742
FLUID SEALING DEVICE
Filed June 18, 1940
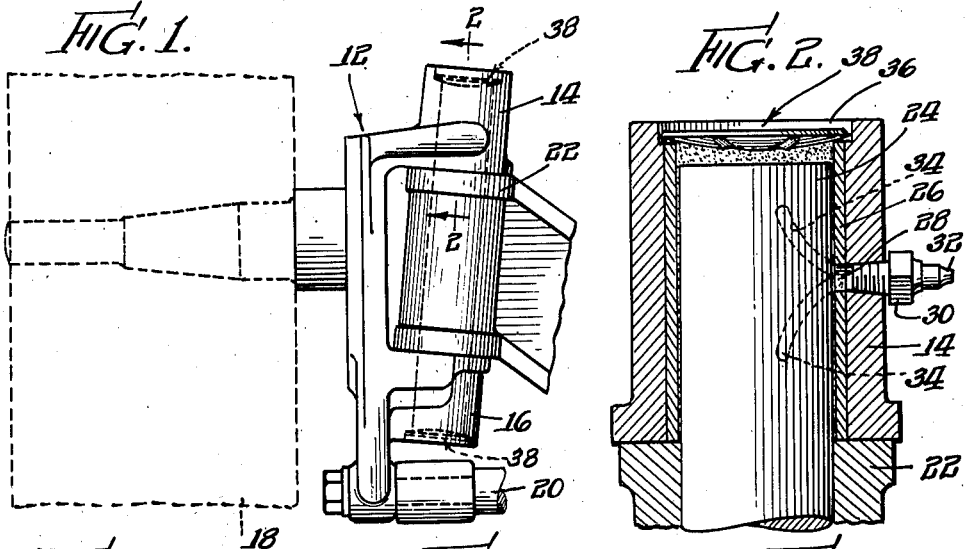
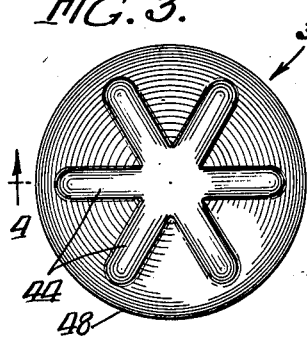
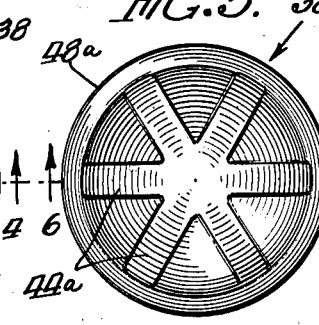
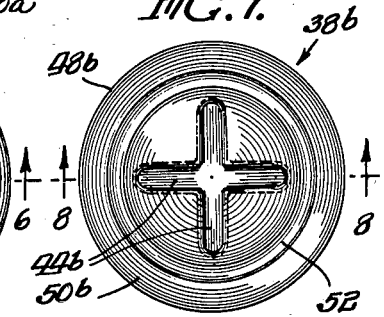
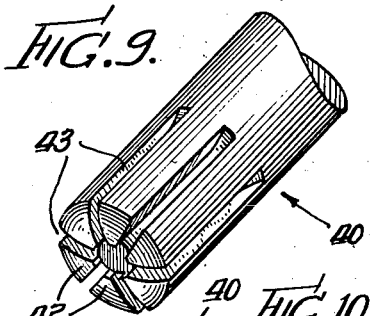
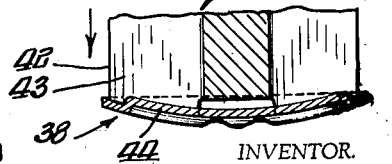
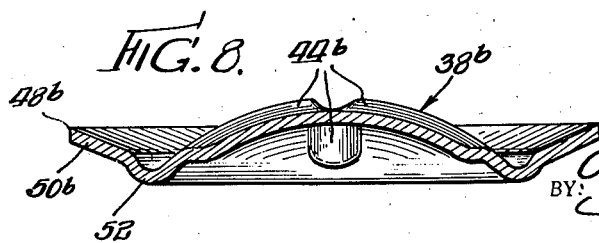
INVENTOR.
Ougljesa Jules Poupitch
BY Cox Moore & Olson
ATTORNEYS Patented Sept. 28, 1943

2,330,742

UNITED STATES PATENT OFFICE 2,330,742

FLUID SEALING DEVICE

Ougljesa Jules Poupitch, Chicago, Ill., assignor to Illinois Tool Works, Chicago, Ill., a corporation of Illinois Application June 18, 1940, Serial No. 341,134

4 Claims. (Cl. 220—24)

This invention relates generally to fluid sealing devices and more particularly to devices for preventing the leakage of a fluid or lubricant which is under pressure.

It has been common practice for a number of years to apply lubricant to bearings and the like under relatively high pressure conditions. I refer to such well-known systems of lubrication as the Alemite system wherein a grease gun is coupled with a nipple on the part to be lubricated, and the lubricant is forced through the nipple into the bearing structure under a relatively high pressure. Difficulties have been experienced in preventing the lubricant introduced under these high pressure conditions from leaking from the free or open side of the bearing structure. The present invention is particularly concerned with and has for one of its important objects the prevention of lubricant leakage under the conditions mentioned above.

It is a further object of the present invention to overcome the aforesaid difficulty and problem of lubricant leakage by the provision of simple, economical, yet very effective means for capping the open side of a bearing structure or the like so as to positively prevent fluid leakage in that vicinity. To this end, the invention contemplates the provision of a sealing means or cap which is so arranged that its sealing effectiveness automatically increases as the pressure acting thereagainst increases.

More specifically, this invention proposes to eliminate fluid leakage by providing a new and improved flexible cap arrangement somewhat in the nature of a diaphragm which is responsive to increases in fluid pressure, the flexing of the diaphragm in response to fluid pressure increases serving to increase the sealing effectiveness of the device.

The foregoing and other objects and advantages will be apparent from the following detailed description when considered in connection with the accompanying drawing, wherein:

Fig. 1 is a fragmentary elevational view of a bearing knuckle for the king-pin of a front wheel assembly of an automobile which is equipped with a fluid sealing device of the type contemplated by the present invention;

Fig. 2 is a fragmentary enlarged central sectional view of the upper bearing member shown in Fig. 1, said view being taken substantially along the line 2—2 of Fig. 1;

Fig. 3 is a plan view of the flexible sealing or diaphragm member illustrated in Fig. 2;

Fig. 4 is a transverse sectional view of the flexible sealing member or diaphragm taken substantially along the line 4—4 of Fig. 3;

Fig. 5 discloses a slightly modified sealing disc or diaphragm member;

Fig. 6 is an enlarged central transverse sectional view taken substantially along the line 6—6 of Fig. 5;

Fig. 7 discloses a further modification of the sealing disc;

Fig. 8 is a transverse sectional view taken substantially along the line 8—8 of Fig. 7;

Fig. 9 is a fragmentary perspective view of a tool which may be employed to force the concavo-convex sealing member or disc into the open side of the bearing structure shown in Figs. 1 and 2; and Fig. 10 is a fragmentary vertical sectional view taken across the lower extremity of the tool of Fig. 9 when said tool is in operative engagement with the concave surface of the sealing device as shown in Fig. 4.

Referring now to the drawing more in detail, it will be noted that for purposes of illustrating one practical application of the invention I have disclosed the invention in association with a bearing knuckle of a motor vehicle. This bearing knuckle includes a frame member 12 provided with spaced co-axially disposed bearing members 14 and 16. The frame 12 forms the support for a wheel 18 indicated by dotted lines in Fig. 1 and at its lower extremity is connected with a steering bar or rod 20. The bearing members 14 and 16 are mounted upon an interposed bearing member 22, and a king-pin 24 passes through the bearing members 14—16—22 as clearly illustrated in Fig. 1.

The present invention is concerned particularly with the problem of securing lubrication within the above mentioned bearings 14 and 16 against leakage at their outer or free extremities; that is to say, leakage of lubricant from the upper extremity of the bearing 14 and the lower extremity of the bearing 16. Each of these bearings is provided with an inner bearing sleeve 26 of suitable material which cooperates directly with the peripheral complementary surface of the king-pin 24. Extending radially through each of the bearings 14 and 16 is a recess 28 which is threaded to receive a screw type nipple 30. The outer extremity 32 of this nipple is designed to receive a complementary socket of a grease gun (not shown) and serves as a coupling member to connect said grease gun with the interior of the bearing member. The bearing sleeve 26 is provided with usual channels 34 to facilitate distribution of lubricant introduced through the nipple 30. The upper extremity of the bearing member 14, as well as the lower extremity of the bearing member 16, is provided with slightly enlarged cylindrical openings 36 designed to receive a flexible sealing disc or diaphragm 38. The external diameter of the sealing member or diaphragm 38 is preferably a few thousandths of an inch larger than the aperture 36 so that when the member 38 is forced into the aperture 36 so as to assume the position shown in Fig. 2, the peripheral margin of the member 38 will firmly bear against the cylindrical wall which defines the aperture 36.

Particular attention is directed to the fact that the flexible sealing member or diaphragm 38 is of concavo-convex form, the convex side thereof facing inwardly with respect to the bearing 14. In the initial assembly of the sealing member 38 with the bearing member 14, I have found it desirable to engage the concave side of the member 38 with a tool 40 having a curved or spherical end surface of a radius slightly less than the radius which determines the concave surface of the member 38. This end surface of the tool 40 comprises a plurality of spherical segments or sections 42 separated by radial grooves 43. Thus, as force is applied by the tool 40 in an axial direction as indicated in Fig. 10 there is a tendency for the concavity of the member 38 to increase, thereby enabling the slightly larger periphery of the disc member 38 to be forced into the smaller aperture 36. Upon releasing the pressure of the tool 40 there is a tendency for the member 38 to spring back to its normal or original concavo-convex shape, thereby tending to slightly enlarge the diameter and thus cause the outer margin of the member 38 to firmly engage the inner cylindrical surface of the bearing member 14. The frictional engagement or binding of the outer margin of the member 38 with the complementary inner surface of the bearing 14 is sufficient, within certain limits, to resist the tendency for fluid pressure to eject the member 38 outwardly. That is to say, the tight fitting of the sealing diaphragm 38 within the bearing 14 is sufficient to withstand ejection and to prevent the leakage of the lubricant from within the bearing member 14 during the initial introduction of lubricant through the nipple 30.

While the initial tight or snug fit of the member 38 within the bearing 14 is sufficient to withstand fluid pressure developed during the initial introduction of the lubricant, additional binding force is required to resist the fluid pressure to which the sealing member 38 is ultimately subjected. These pressures may range between 1100 and 1700 pounds per square inch. In this connection it should be noted that before these higher fluid pressures are attained, the inner portion of the concavo-convex body will flex outwardly or in other words will experience a tendency to approach a common plane. This movement of the disc or diaphragm body causes the disc periphery to be urged radially outward into tighter engagement with the surface of the bearing member 14 defined by the aperture 36. In fact, this increase in peripheral binding and sealing engagement resulting from the outward flexing of the concavo-convex body of the member 38 is sufficient to withstand fluid pressures necessary for adequate lubrication and to positively secure the lubricant against leakage from the free or outward side of the bearing members.

I prefer to employ a flexible sealing member or disc as shown in Figs. 2 to 4, inclusive, wherein the body of the disc is provided with a plurality of radially extending ribs 44. These ribs are pressed out of the disc stock so as to lend strength to the disc body. By employing these ribs a relatively thin stock may be used without sacrifice of the strength which is required to withstand the high lubricant pressures within the bearing. It will be noted that the peripheral margin or surface 46 of the diaphragm 38, Fig. 4, extends in substantial parallelism with the diaphragm axis and thus cooperates with the adjacent concave surface of the disc so as to present an acute peripheral biting edge 48. As the disc experiences outward flexing after it has been initially applied to the bearing by the tool 10, this acute marginal edge 48 embeds itself within the companion bearing surface. The embedding of the edge 48 within the bearing structure sets up effective resistance to force, tending to dislodge the disc or diaphragm 38.

In Figs. 5 and 6 a modified disc construction is shown, this disc being designated generally by the numeral 38a. The only structural difference between the disc or diaphragm 38 and the member 38a is that the outer marginal section of the disc 38a, designated by the numeral 50, is bent or flexed downwardly, whereas in the disc member 38 this marginal portion conforms with the general concavo-convex configuration of the disc body. The arrangement shown in Figs. 5 and 6 also provides an edge 48a. Due to the downward flexing of the outer marginal section 50, the edge 48a, as distinguished from the circumferential marginal surface extending downwardly from said edge, is presented to the work. In other words, immediately upon the upward flexing of the central portion of the disc or diaphragm 38a, the edge 48a is aggressively presented to the internal cylindrical surface of the work. It will also be noted that the diaphragm 38a is provided with radially extending ribs 44a which correspond structurally and functionally with the ribs 44 of the diaphragm 38 previously described.

Figs. 7 and 8 disclose a further modified disc or diaphragm construction designated generally by the numeral 38b. It will be noted that the outer marginal section 50b of the diaphragm 38b is flexed upwardly and is connected with the central dished portion of the diaphragm body with an annular bead or rib 52. An acute work engaging edge 48b is presented along the periphery of the disc member and ribs 44b are provided which correspond functionally and structurally with the ribs 44 and 44a previously described. The disc member 38b differs from the discs 38 and 38a in that the body of the disc 38b is dished in a direction opposite to that of the body of the discs 38 and 38a. Due to the marginal flange 50b and the annular bead or rib forming the connection between the marginal section 50b and the main body of the diaphragm 38b, the edge 48b tends to dig into the work in response to movement of the central portion of the diaphragm upwardly as shown in Fig. 8. This takes place despite the fact that the diaphragm 38b is normally dished outwardly with respect to the bearing structure with which it is associated.

All forms of the diaphragms previously described are capable of being inserted within the cylindrical opening of a bearing section such as the bearing section disclosed in Fig. 2. The process of insertion may be carried out very expeditiously by the use of the tool 40. As previously pointed out, the faces of the tool segments 42 are adapted to engage the body portions of the diaphragms between the ribs 44—44a and these ribs are adapted to register with the grooves 43. It will be apparent from the foregoing that the invention contemplates employing a disc or a concavo-convex diaphragm of improved practical construction which when subjected to fluid pressure above a predetermined amount will not be ejected from a bearing structure but will tend to slightly increase in diameter and thus materially increase its resistance to ejection. The diaphragms or closure members contemplated hereby may be very economically produced, and due to their structural arrangement sheet stock of relatively light gauge may be employed.

I have found in the practical use of diaphragms contemplated by the present invention, as for example the diaphragm shown in Figs. 1 to 4, inclusive, fluid pressure against the diaphragm first gives evidence of its effect upon the segments of the stock positioned between the radial ribs 44. Thus, the fluid pressure first causes a slight bulging outwardly of the areas between the ribs, whereas the ribs which possess more rigidity do not exhibit the same degree of yield. Experience has shown that due to this slight bulging of the areas between the ribs a slight seepage or leakage of lubricant is sometimes apparent along the periphery of the disc intermediate of each segment between the ribs. When this point is reached it is an indication that sufficient fluid pressure has been established within the bearing. This provides a simple method for determining when the fluid pressure in the bearing has reached the required maximum.

Obviously, the invention is not limited to the particular design and configuration of disc or diaphragm disclosed herein but is capable of other modifications and changes without departing from the spirit and scope of the appended claims.

The invention is hereby claimed as follows:

1. A diaphragm member for use with a structure having a chamber for receiving fluid under pressure, said structure being provided with an opening communicating with said chamber for receiving the diaphragm, said diaphragm comprising a relatively flat circular member having a general dished shaped annular portion, said diaphragm being adapted to fit snugly within said opening with the dished annular portion of the diaphragm projecting in the direction of the pressure within said chamber, whereby said diaphragm is radially expansible by an increase in pressure within the chamber to increase the pressure engagement between the annular margin of the diaphragm and the engaged surfaces of said opening, said annular margin being provided with an abruptly formed sharp biting edge, and said diaphragm being provided with central portions thereof struck or deformed from the plane of the annular dished portion of the diaphragm to provide less resilient strengthening portions, increasing the strength of the diaphragm and thereby facilitating the use of a stock of less thickness to increase the resiliency of said annular dished and radially expansible portion.

2. A structure as defined in claim 1, wherein said annular margin of the diaphragm is provided with an acute angled biting edge for engagement with the surfaces of the walls of said opening within which the diaphragm is to be fitted.

3. A structure as defined in claim 1, wherein said struck or deformed portions comprise a dome portion reversely bent from the general dished annular portion.

4. A structure as defined in claim 1, wherein said struck or deformed portions comprise a plurality of ribs radiating outwardly from the diaphragm axis and terminating in spaced relation from the peripheral edge thereof.

OUGLJESA JULES POUPITCH.